US012806953B2

(12) United States Patent
Ulrich et al.

(10) Patent No.: US 12,806,953 B2

(45) Date of Patent: Nov. 24, 2026

(54) SYSTEM AND METHOD FOR AIR SUSPENSION CONTROL

(71) Applicant: SCOUT MOTORS INC., Tysons, VA (US)

(72) Inventors: Markus Ulrich, Tysons, VA (US); Sven Schmalzrieth, Tysons, VA (US)

(73) Assignee: SCOUT MOTORS INC., Tysons, VA (US)

( * ) Notice: Subject to any disclaimer, the term of this patent is extended or adjusted under 35 U.S.C. 154(b) by 167 days.

(21) Appl. No.: 18/812,412

(22) Filed: Aug. 22, 2024

(65) Prior Publication Data

US 2026/0054536 A1 Feb. 26, 2026

(51) Int. Cl.

*B60G 17/018* (2006.01)
*B60G 17/0165* (2006.01)

(52) U.S. Cl.

CPC ....... *B60G 17/018* (2013.01); *B60G 17/0165* (2013.01)

(58) Field of Classification Search

CPC ............ B60G 17/0162; B60G 17/0164; B60G 17/0165; B60G 17/018; B60G 17/019; B60G 17/01908; B60G 2300/07; B60G 2400/1042; B60G 2400/1062; B60G 2400/208; B60G 2400/252; B60G 2400/44; B60G 2400/82; B60G 2400/90; B60G 2500/10; B60G 2500/30; B60G 2800/016; B60G 2800/212; B60G 2800/22; B60G 2800/24

See application file for complete search history.

(56) References Cited

U.S. PATENT DOCUMENTS

| | | | | |
|---|---|---|---|---|
| 12,345,603 B1 * | 7/2025 | Lukianov | G01M 17/02 |
| 2014/0195116 A1 * | 7/2014 | Hrovat | B60W 30/143 701/38 |
| 2016/0023530 A1 | 1/2016 | Guest | |
| 2017/0158016 A1 | 6/2017 | Hahn et al. | |
| 2017/0225535 A1 * | 8/2017 | Batsch | B60G 17/0195 |
| 2018/0250998 A1 * | 9/2018 | Sigmar | B60K 17/358 |
| 2020/0016951 A1 | 1/2020 | Letizio et al. | |
| 2020/0164711 A1 * | 5/2020 | Tuhro | B60G 17/0523 |
| 2020/0207176 A1 * | 7/2020 | Baker | B60G 17/0525 |
| 2023/0045560 A1 | 2/2023 | Abdallah et al. | |
| 2024/0059118 A1 | 2/2024 | Ali et al. | |

* cited by examiner

*Primary Examiner* — Hai H Huynh
*Assistant Examiner* — Johnny H Hoang
(74) *Attorney, Agent, or Firm* — Alston & Bird LLP

(57) ABSTRACT

Provided herein is an apparatus, system, and method for automatically adjusting suspension height of a vehicle based on the status of at least one wheel. Methods can include: determining, with at least one sensor, a status of at least one wheel of a vehicle; identify a suspension height of at least one remaining wheel of the vehicle other than the at least one wheel; and adjusting the suspension height of the at least one remaining wheel using a suspension system including a plurality of height-adjustable springs, each of the plurality of height-adjustable springs associated with a respective wheel of the vehicle to change the status of the at least one wheel.

18 Claims, 6 Drawing Sheets

SYSTEM AND METHOD FOR AIR SUSPENSION CONTROL

BACKGROUND

Vehicles, and particularly vehicles designed for off-road use, are often equipped with off-road suspension systems. Off-road suspension systems are generally characterized by longer suspension travel ranges from a full extension to full compression. This long suspension travel is to accommodate rugged terrain often encountered off-road. The spring rates are also generally lower to better enable suspension travel as the vehicle traverses rugged terrain. While such off-road suspension systems are better suited to off-road travel, they still retain some limitations that can hinder vehicle performance. Adjustable suspension systems are capable of adjusting suspension characteristics through changing spring rates and/or changing suspension travel ranges. Adjustable suspension can be employed to adjust vehicle handling characteristics for use in different environments and over different types of terrain. Such systems can use higher suspension travel ranges and softer spring rates for off-road travel, while using lower suspension travel ranges and firmer spring rates for on-road use.

SUMMARY

A system and method are therefore provided for suspension control, and more particularly, for controlling air suspension of a vehicle responsive to suspension travel positions to change the status of at least one wheel of the vehicle. Embodiments provided herein include a vehicle including: a suspension system comprising a plurality of height-adjustable springs, each of the plurality of height-adjustable springs associated with a respective wheel of the vehicle; at least one sensor; and a controller, wherein the controller is configured to: determine, with the at least one sensor, a status of at least one wheel; identify a suspension height of at least one remaining wheel other than the at least one wheel; and adjust the suspension height of the at least one remaining wheel to change the status of the at least one wheel.

According to some embodiments the status includes a degree of contact with a terrain over which the vehicle is traveling. The status of some embodiments includes a lack of contact between the at least one wheel and a terrain over which the vehicle is traveling. According to certain embodiments the controller configured to adjust the suspension height of the at least one remaining wheel to change the status of the at least one wheel is configured to adjust the suspension height of the at least one remaining wheel to regain contact between the terrain and the at least one wheel.

According to some embodiments the controller configured to adjust the suspension height of the at least one remaining wheel to regain contact between the terrain and the at least one wheel includes that the controller is configured to: adjust the suspension height of the at least one remaining wheel independently to regain contact between the terrain and the at least one wheel. The controller configured to adjust the suspension height of the at least one remaining wheel to regain contact between the terrain and the at least one wheel is in some embodiments controller configured to: lower the suspension height of the at least one remaining wheel to regain contact between the terrain and the at least one wheel.

The status of some embodiments includes a reduced level of contact with a terrain over which the vehicle is traveling.

According to some embodiments the reduced level of contact with the terrain over which the vehicle is traveling is determined based, at least in part, on a measured rotational torque at the at least one wheel. The reduced level of contact with the terrain in some embodiments is determined based, at least in part, on the measured rotational torque at the at least one wheel being a predefined amount below an expected rotational torque at the at least one wheel.

Embodiments provided herein include a method including: determining, with at least one sensor, a status of at least one wheel of a vehicle; identify a suspension height of at least one remaining wheel of the vehicle other than the at least one wheel; and adjusting the suspension height of the at least one remaining wheel using a suspension system including a plurality of height-adjustable springs, each of the plurality of height-adjustable springs associated with a respective wheel of the vehicle to change the status of the at least one wheel.

The status of an example embodiment includes a degree of contact with a terrain over which the vehicle is traveling. The status of some embodiments includes a lack of contact between the at least one wheel and a terrain over which the vehicle is traveling. According to some embodiments adjusting the suspension height of the at least one remaining wheel to change the status of the at least one wheel includes: adjusting the suspension height of the at least one remaining wheel to regain contact between the terrain and the at least one wheel.

According to certain embodiments adjusting the suspension height of the at least one remaining wheel to regain contact between the terrain and the at least one wheel includes: adjusting the suspension height of the at least one remaining wheel independently to regain contact between the terrain and the at least one wheel. According to certain embodiments adjusting the suspension height of the at least one remaining wheel to regain contact between the terrain and the at least one wheel includes: lowering the suspension height of the at least one remaining wheel to regain contact between the terrain and the at least one wheel.

The status of some embodiments includes a reduced level of contact with a terrain over which the vehicle is traveling. The method of some embodiments further includes: measuring rotational torque at the at least one wheel; and determining the reduced level of contact with the terrain over which the vehicle is traveling. The method of some embodiments also includes determining the reduced level of contact with the terrain based, at least in part, on the measured rotational torque at the at least one wheel being a predefined amount below an expected rotational torque at the at least one wheel.

Embodiments provided herein include an apparatus including at least one processor and at least one non-transitory memory including computer program code instructions, the computer program code instructions configured to, when executed by the at least one processor, cause the apparatus to: determine, with at least one sensor, a lack of contact between at least one wheel and a terrain over which a vehicle is traveling; identify a suspension height of at least one remaining wheel of the vehicle other than the at least one wheel; and adjust the suspension height of the at least one remaining wheel using a suspension system comprising a plurality of height-adjustable springs, each of the plurality of height-adjustable springs associated with a respective wheel of the vehicle to regain contact of the at least one wheel with the terrain.

According to some embodiments causing the apparatus to adjust the suspension height of the at least one remaining wheel to regain contact between the terrain and the at least one wheel includes causing the apparatus to: adjust the suspension height of the at least one remaining wheel independently to regain contact between the terrain and the at least one wheel.

DESCRIPTION OF THE DRAWINGS

Figure 1:
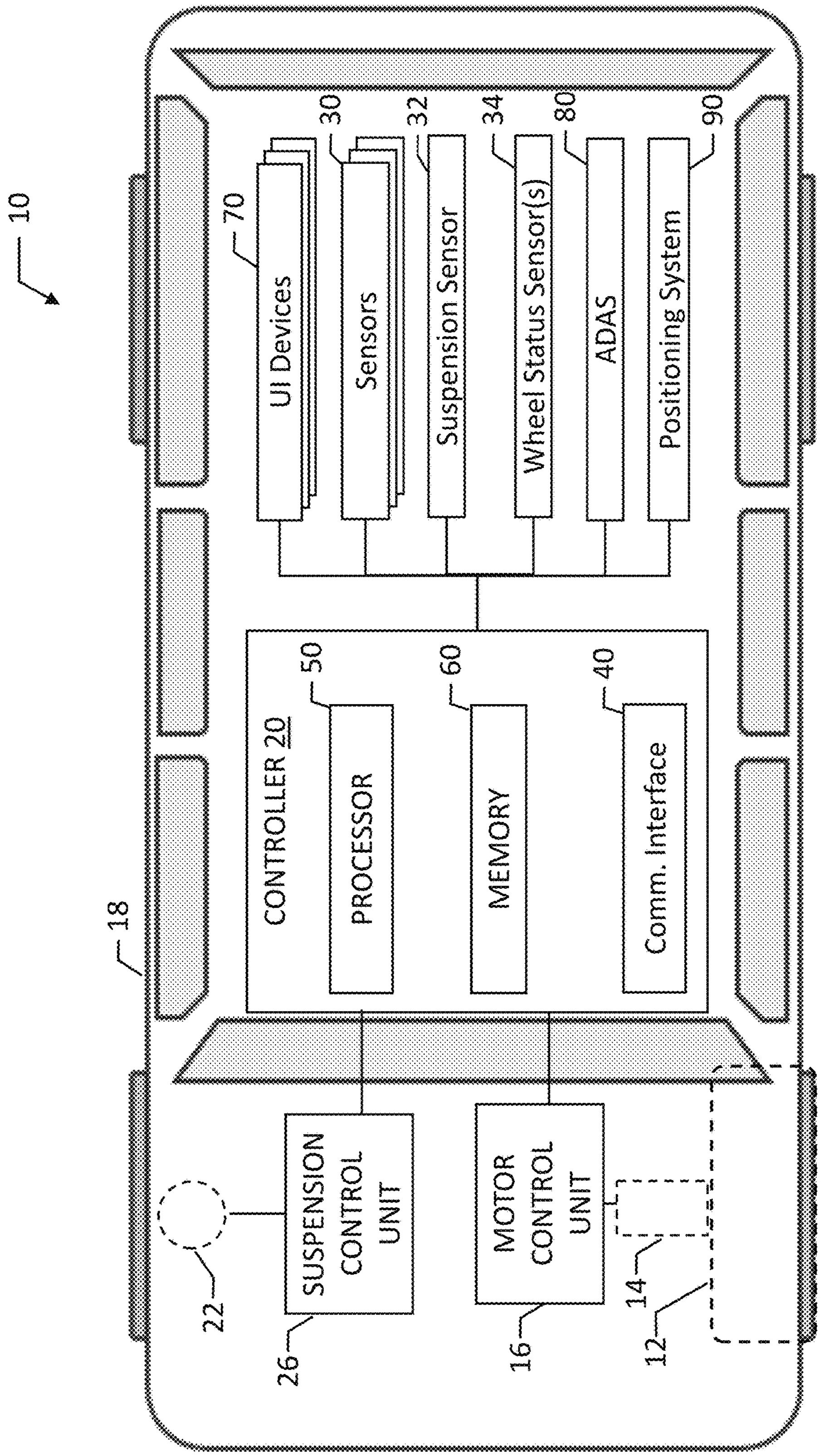
Figure 2:
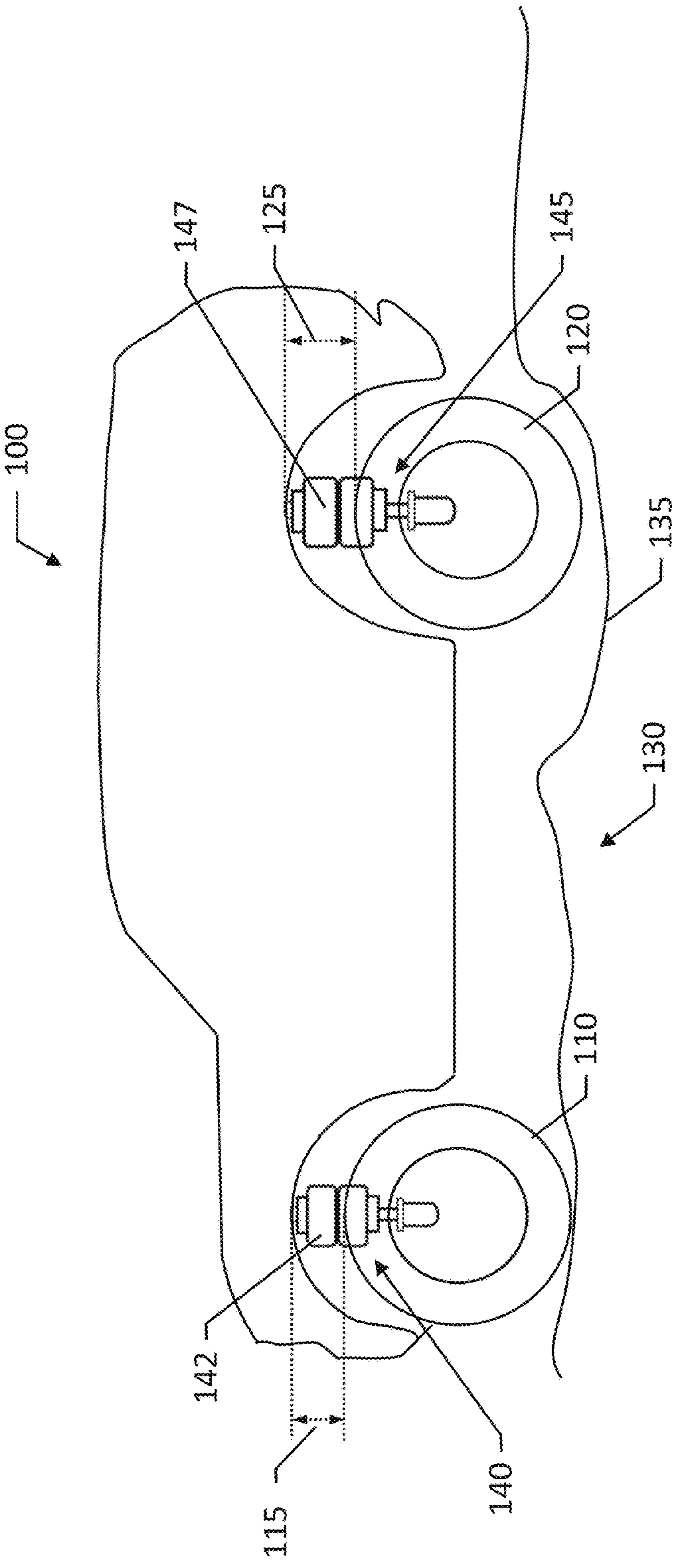
Figure 3:
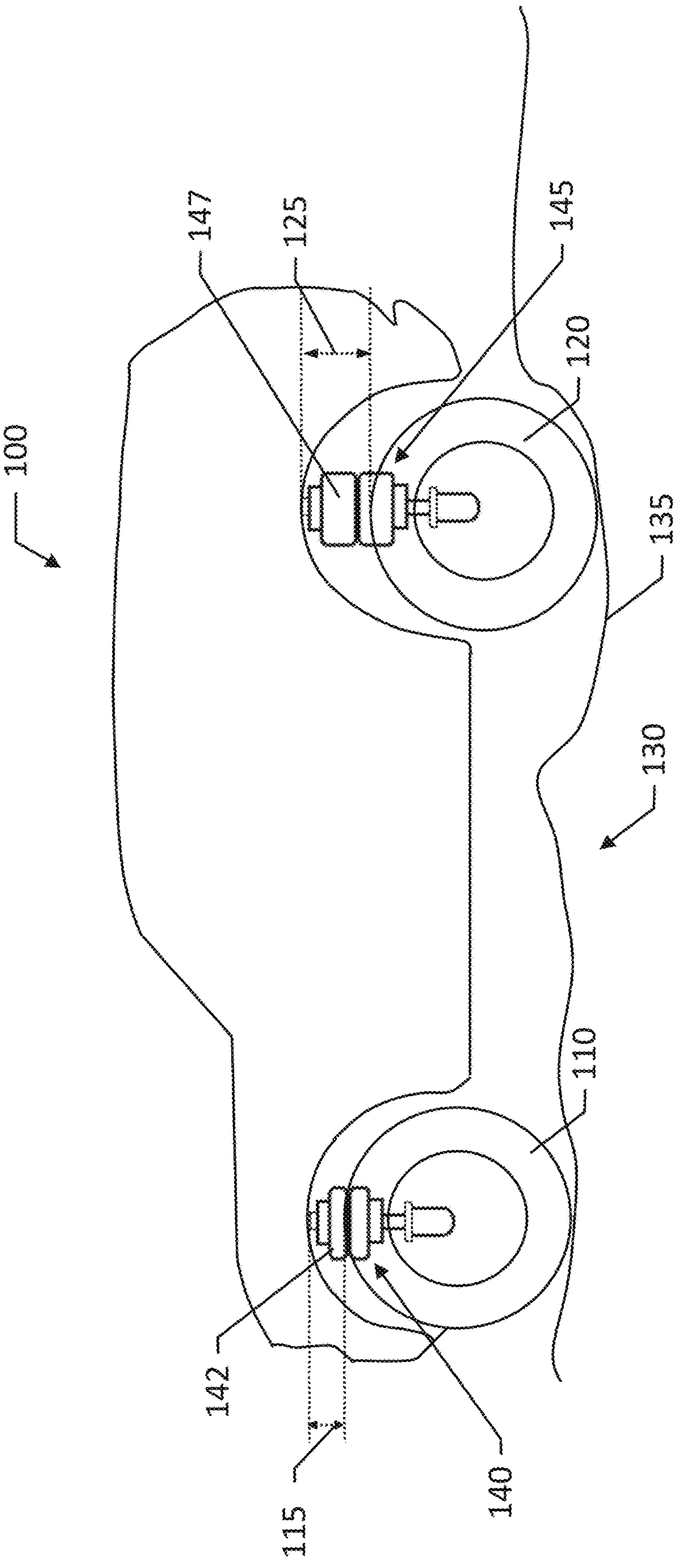
Figure 4:
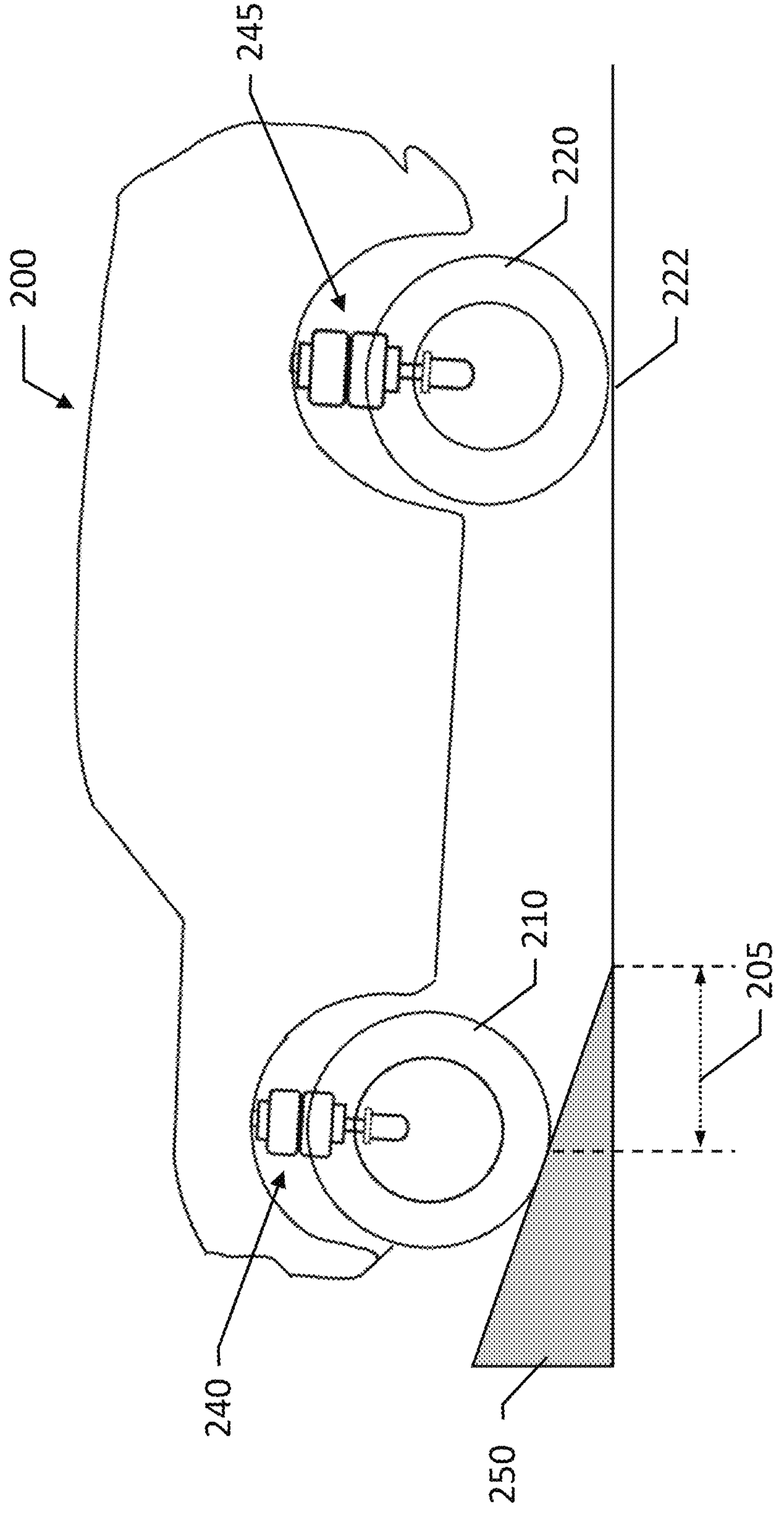
Figure 5:
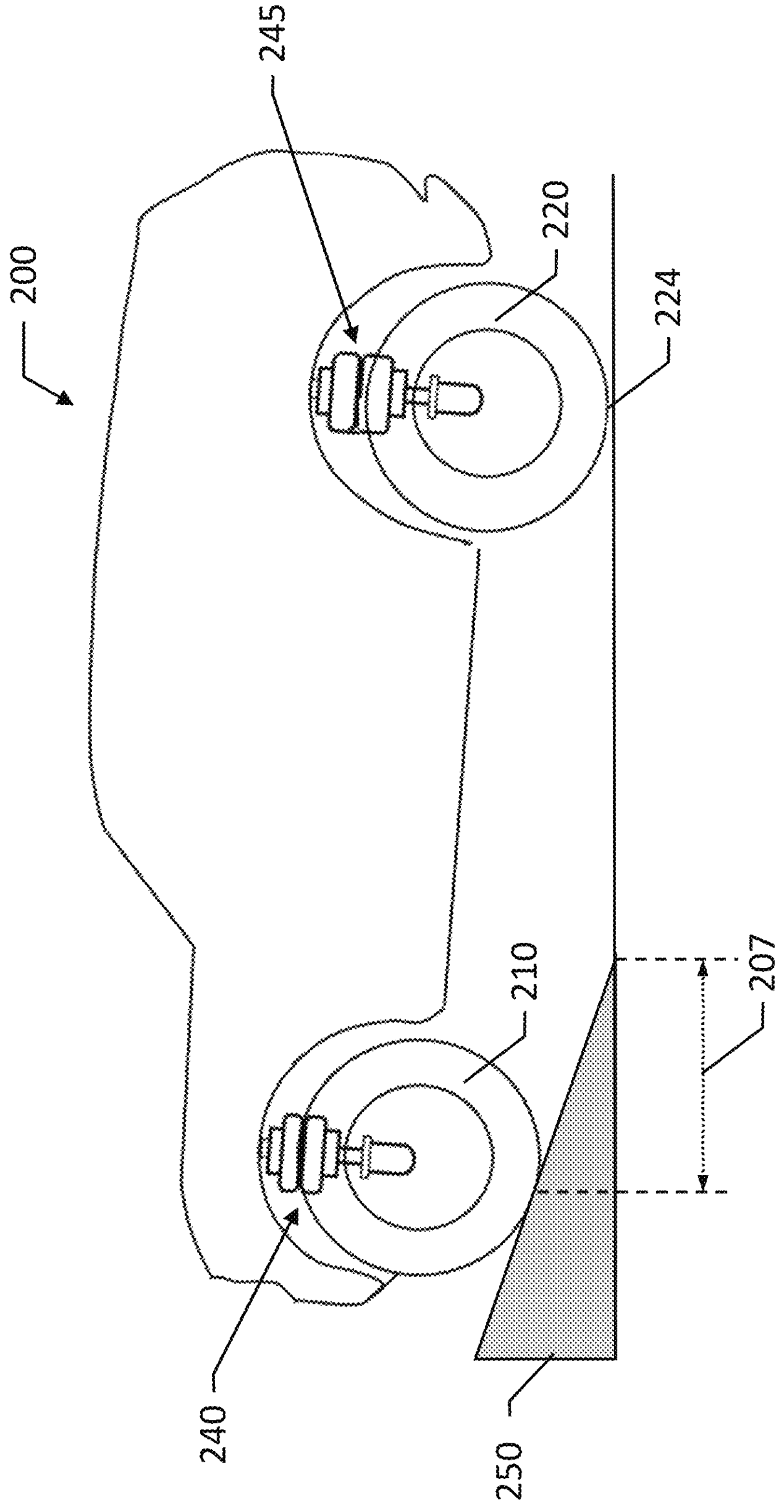
Figure 6:
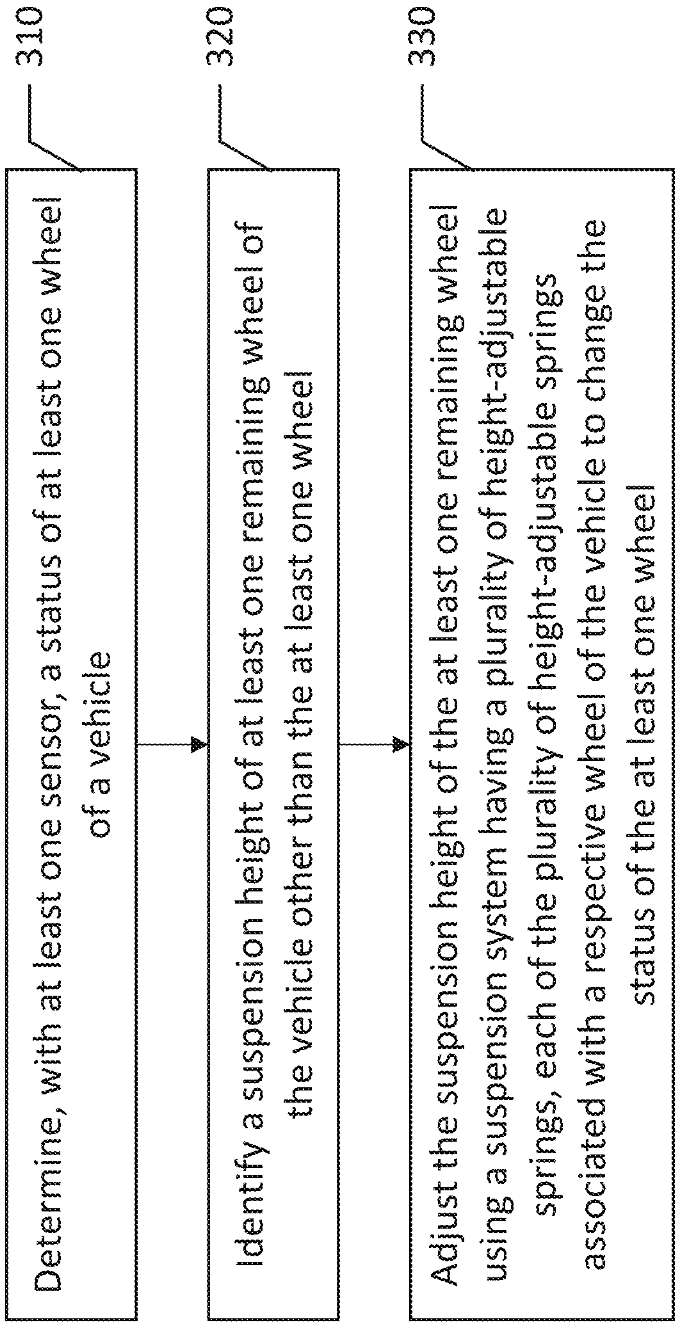

Having thus described certain example embodiments of the present disclosure in general terms, reference will hereinafter be made to the accompanying drawings which are not necessarily drawn to scale, and wherein:

FIG. 1 illustrates a block diagram of a controller for a vehicle or subsystem thereof for automatic suspension height adjustment according to an example embodiment of the present disclosure;

FIG. 2 illustrates a profile view of a vehicle traveling over terrain that includes a rut according to an example embodiment of the present disclosure;

FIG. 3 illustrates the profile view of FIG. 2 with suspension height adjusted to change a status of a wheel according to an example embodiment of the present disclosure;

FIG. 4 illustrates a vehicle with adjustable suspension in a high ride height performing a Ramp Travel Index test according to an example embodiment of the present disclosure;

FIG. 5 illustrates a vehicle with adjustable suspension in a relatively lower ride height performing the Ramp Travel Index test according to an example embodiment of the present disclosure; and FIG. 6 illustrates a flow chart of a process for automatic suspension height adjustment according to an example embodiment of the present disclosure.

DETAILED DESCRIPTION

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

Embodiments described herein generally relate to suspension control of a vehicle, and more particularly to controlling suspension characteristics of a vehicle based on at least one property of one or more wheels of the vehicle. Adjustable vehicle suspension can be manually controlled to be better suited to the terrain and comfort or handling priorities of a driver. Embodiments described herein automatically control suspension characteristics based on one or more sensors of the vehicle detecting one or more properties of at least one wheel. This automatic adjustment improves vehicle performance when encountering rugged terrain.

According to an example embodiment, individual wheel suspension characteristics can be adjusted to improve vehicle traction and vehicle attitude, particularly when one or more wheels is elevated above the terrain or when one or more wheels are not loaded by a substantial portion of the vehicle weight. When traveling off-road or more generally over uneven terrain, a vehicle can encounter a situation where one or more wheels loses contact with the terrain. The orientation of the vehicle itself relative to the terrain may result in one or more wheels becoming suspended above the terrain. This may be particularly true for a vehicle with off-road suspension where the suspension is lifted or set at a higher distance from the terrain to the vehicle frame.

Control of suspension characteristics can improve the vehicle performance and safety through ensuring appropriate contact between vehicle wheels and the terrain over which the vehicle is traveling. Embodiments provide a mechanism by which a status of at least one wheel is identified as a vehicle traverses terrain. Based on the status of the at least one wheel, suspension adjustments are made, such as by a suspension controller or vehicle control unit to change the status of the at least one wheel. One such scenario involves a status of a loss of contact of a wheel with terrain over which the vehicle is traveling. In such a scenario, the suspension height of each remaining wheel can be adjusted, such as by lowering, to increase suspension articulation and change the status of the wheel that lost contact with the terrain to return to a status of contacting the terrain.

A suspension system of embodiments described herein can be controlled, for example, using a controller where the controller may be embodied as a vehicle controller or a sub-unit controller of the vehicle, such as suspension system controller. FIG. 1 is a schematic diagram of an example embodiment of a vehicle 10 and a controller 20. The vehicle 10 is depicted with body 18 which generally encompasses the structure of the vehicle. The controller 20 of some embodiments is integrated into the vehicle 10 and connected to different elements described herein, such as through a wiring harness. The illustrated controller 20 can be embodied as any controller of the vehicle 10 for controlling any features of the vehicle 10, with the depicted features of the illustrated embodiment being optional depending upon the application. For example, as mentioned above, the controller 20 can be embodied as a suspension system controller; however, the present disclosure is not intended to be limiting in this regard. In other embodiments, the controller 20 could be a stand-alone controller or could be embodied via another vehicle controller, such as a vehicle control unit (VCU), an Advanced Driver Assistance System (ADAS) controller, an electronic control unit (ECU), or the like.

The controller 20 of FIG. 1 can be configured to perform any of the operations described herein. Controller 20 is an example embodiment that may be embodied by or associated with any of a variety of computing devices that include or are otherwise associated with a vehicle. The controller 20 can be in communication with any systems, sensors, or other controllers of the vehicle 10, such as via a communications interface (e.g., a CAN bus). According to some embodiments, the controller 20 can include a computing device that provides instructions or commands to a vehicle control module or other vehicle controller, where the controller is a device in communication with various vehicle systems and control architectures.

Optionally, the controller 20 may be embodied by or associated with a plurality of computing devices that are in communication with or otherwise networked with one another such that the various functions performed by the apparatus may be divided between the plurality of computing devices that operate in collaboration with one another.

The controller 20 may include, be associated with, or may otherwise be in communication with a communication interface 40, a processor 50, and a memory 60 The controller 20 may be in communication with one or more user interface devices 70, such as one or more displays that may include touch screen displays. In some embodiments, the processor 50 (and/or co-processors or any other processing circuitry assisting or otherwise associated with the processor) may be in communication with the memory 60 via a bus for passing information among components of the controller. The memory 60 may be non-transitory and may include, for example, one or more volatile and/or non-volatile memories. In other words, for example, the memory may be an electronic storage device (for example, a computer readable storage medium) comprising gates configured to store data (for example, bits) that may be retrievable by a machine (for example, a computing device like the processor). The memory 60 may be configured to store information, data, content, applications, instructions, or the like for enabling the apparatus to carry out various functions in accordance with an example embodiment of the present disclosure. For example, the memory 60 could be configured to buffer input data for processing by the processor. Additionally or alternatively, the memory 60 could be configured to store instructions for execution by the processor.

The processor 50 may be embodied in a number of different ways. For example, the processor 50 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 50 may include one or more processing cores configured to perform independently. A multi-core processor may enable multiprocessing within a single physical package. Additionally or alternatively, the processor 50 may include multiple processors configured in tandem via the bus to enable independent execution of instructions, pipelining and/or multithreading.

In an example embodiment, the processor 50 may be configured to execute instructions stored in the memory 60 or otherwise accessible to the processor. Alternatively or additionally, the processor 50 may be configured to execute hard coded functionality. As such, whether configured by hardware or software methods, or by a combination thereof, the processor 50 may represent an entity (for example, physically embodied in circuitry) capable of performing operations according to an embodiment of the present disclosure while configured accordingly. Thus, for example, when the processor 50 is embodied as an ASIC, FPGA or the like, the processor 50 may be specifically configured hardware for conducting the operations described herein.

Alternatively, as another example, when the processor 50 is embodied as an executor of software instructions, the instructions may specifically configure the processor 50 to perform the algorithms and/or operations described herein when the instructions are executed. However, in some cases, the processor 50 may be a processor of a specific device (for example, the computing device) configured to employ an embodiment of the present disclosure by further configuration of the processor by instructions for performing the algorithms and/or operations described herein.

As noted above, the controller 20 of an example embodiment may also include or otherwise be in communication with one or more user interface devices 70. The user interface devices 70 can include any feature of the vehicle 10 that a user interacts with including features such as climate control, infotainment interface, gauge cluster, etc. In this regard, the user interface devices 70 may include or otherwise be in communication with one or more displays, such as an infotainment system display, a gauge cluster, an entertainment system display (e.g., for rear seat passengers) or the like. The user interface devices 70 may optionally include one or more speakers, physical buttons, analog display (e.g., speedometer, fuel gauge, etc.) and/or other input/output mechanisms. The user interface devices 70 may be incorporated into the vehicle 10, such as a dedicated navigation system display/audio system or a device that can attach or associate with the vehicle via communication link. In an example embodiment, the processor 50 may include user interface circuitry configured to control at least some functions of one or more input/output mechanisms. The processor 50 and/or user interface circuitry comprising the processor 50 may be configured to control one or more functions of one or more input/output mechanisms through computer program instructions (for example, software and/or firmware) stored on a memory accessible to the processor (for example, memory 60, and/or the like).

As shown, the vehicle 10 may be equipped with any number of sensors 30. As described herein, a "sensor" refers to any sensing device which can be used to determine properties of the environment of the vehicle 10, properties of the vehicle itself, forces applied from/to the vehicle, or the like. Accordingly, the sensors 30 can include, but are not limited to, image sensors, LiDAR sensors, wheel speed sensors, and/or tire pressure sensors, among various other types of sensors. For example, the sensor 30 can determine a speed of movement of the vehicle in some embodiments and/or an amount of torque required to rotate a wheel of the vehicle. In some embodiments, a sensor, such as wheel status sensor 34 can determine an amount of load at each wheel of a vehicle, such as through load carried by suspension components at each wheel. As another example, the wheel status sensor 34 sensor can be embodied as a tire pressure sensor that can determine a current tire pressure of a tire of the vehicle. In some embodiments the wheel status sensor 34 can be embodied by a wheel speed sensor. Embodiments may optionally include a suspension sensor 32, whereby the suspension sensor can sense one or more properties of the suspension at each wheel. For example, the suspension sensor 32 can be embodied by a sensor that determines a suspension height, such as a proximity sensor or sensor that measures a distance between certain suspension components. In some embodiments including those with air springs or air suspension, the suspension sensor 32 can be embodied by a pressure sensor to detect pressure in the air springs.

It should be appreciated that the vehicle 10 may include a number of other sensors which may not be explicitly illustrated. For example, the vehicle 10 may include one or more of an accelerometer, a gyroscope, and a speed sensor to sense information regarding the movement, positioning, or orientation of the vehicle 10, e.g., for use in navigation assistance. In one such example, the vehicle 10 (or the controller 20 itself) could include an inertial measurement unit (IMU) that functions as an accelerometer and a gyroscope. The vehicle 10 may also include a light sensor, various image sensors (e.g., cameras), and more. As described in greater detail below, for example, the vehicle 10 may include various sensors and/or transceivers used for detecting a position, speed, etc. (e.g., for navigation) and/or for implementing various driving aids (e.g., parking sensors, radar for automatic cruise control and/or automated braking, cameras for lane center and object avoidance, etc.).

The controller 20 of an example embodiment may also optionally include a communication interface 40 that may be any means such as a device or circuitry embodied in either hardware or a combination of hardware and software that is configured to receive and/or transmit data from/to other electronic devices in communication with the controller 20. Additionally or alternatively, the communication interface 40 may be configured to communicate over any wired or wireless communication protocols. In some environments, the communication interface 40 may alternatively or additionally support vehicle to vehicle or vehicle to infrastructure wireless links.

The controller 20 of an example embodiment can be embodied by or otherwise in communication with various other vehicle controllers which can be separate or in a single module; however, it will be appreciated that these controllers function in concert to enable various aspects of vehicle functionality. As such, the controller 20 can be interpreted as a general controller performing each of these functions to enable vehicle functionality accordingly.

As shown, the vehicle 10 can further include an advanced driver assistance system (ADAS) 80 configured to perform various driver-assistance functions of a vehicle, including control features that may be part of autonomous control of a vehicle, such as adaptive headlight aiming, adaptive cruise control, adaptive suspension control, lane departure warning and control, curve warning, and hazard warning, among others.

The ADAS 80 may be used to provide various functionality of a vehicle and may be implemented to improve the comfort, efficiency, safety, and overall satisfaction of driving. Some of these advanced driver assistance systems use a variety of sensors in the vehicle to determine the current state of the vehicle and the current state of the roadway ahead of the vehicle. These sensors may include radar, infrared, ultrasonic, and vision-oriented sensors such as image sensors and light distancing and ranging (LiDAR) sensors. According to some embodiments, and which may be particularly useful for off-road capable vehicle, the sensors of an ADAS 80 can include, for example, various cameras such as cameras directed to the wheels and terrain proximate the wheels to help guide a driver/occupant with respect to how to navigate challenging off-road terrain. These cameras can be in the vehicle and/or around the exterior of the vehicle, such as in a wheel arch, fender flare, wing mirror, bumper, brush guard, etc.

The vehicle 10 can optionally include a positioning system 90 which may be in communication with controller 20 as shown in FIG. 1. The positioning system can include any type of Global Navigation Satellite Systems (GNSS) such as the Global Positioning System (GPS), BeiDou Navigation Satellite System (BDS) positioning system, Galileo positioning system, or any other standardized positioning system. The positioning system 90 can optionally include systems that are not satellite-based, but use other methods of localization, such as wireless access point triangulation or the like. The positioning system 90 can be used in conjunction with the ADAS 80 or user interface devices 70 such as a navigation system, for example. The positioning system 90, if employing a highly accurate localization technique, may be able to determine speed of movement of the vehicle and/or may otherwise be used to supplement other speed of movement determinations (e.g., using wheel speed sensors).

Also shown in FIG. 1 is one of the wheels 12, which in the illustrated embodiment is a driven wheel powered by motor 14. The motor 14 may be controlled, for example, by motor control unit 16, which may be part of or in communication with a powertrain control unit (PCU). In some implementations, for example, controller 20 itself could be a PCU that also controls a suspension system of vehicle 10. In other implementations, the PCU may be a device separate from controller 20, e.g., where controller 20 and the PCU are in communication (e.g., via a CAN bus). The motor 14 may be one of the motors powering drive wheels of the vehicle 10, where each driven wheel may have its own motor or receive power via a gearbox (e.g., a differential) driven by a motor. The one or more motors and corresponding motor control units together form the powertrain of an example vehicle 10. The motor control unit 16 may also sense properties of or a status of a wheel controlled by the motor control unit. For example, the motor control unit may identify a torque required to rotate the wheel and deduce from this required torque, particularly relative to other driven wheels, a degree of traction or contact with a terrain for a particular wheel. This status of a wheel can be used by a controller as described herein to adjust suspension parameters to change the status of the wheel.

FIG. 1 further includes an illustration of suspension components of a wheel of the vehicle. As shown, the suspension can include a suspension element 22 which can include a shock absorber, a spring, a coil over shock, or in some embodiments an air spring. An air spring in air suspension is suspension that relies on air pressure in a bladder that functions as the spring to replace or supplement a conventional spring. Air springs can be height adjustable based on a pressure within the air bladder. To increase or decrease air pressure within an air spring air bladder, a compressor may be used and controlled by a controller and an air tank may be employed to store compressed air to provide more immediate air spring adjustment than can be provided by the compressor alone. The controller and/or the compressor can be embodied by the illustrated suspension control unit 26.

While the vehicle 10 of FIG. 1 is illustrated as being an electric vehicle with one or more electric motors driving the driven wheels of the vehicle, embodiments described herein can be employed with any type of powertrain. The powertrain of a vehicle, as described herein, includes a drive system, which enables power to be provided to the driven wheels of the vehicle. The powertrain can be that of (i) a conventional internal combustion engine (including gears, driveshafts, etc.), (ii) a hybrid-electric vehicle employing both an internal combustion engine and electric motors, or (iii) a purely electric vehicle employing electric motors for the powertrain.

Vehicles, and particularly off-road vehicles can be equipped with suspension components that are adjustable. Embodiments described herein are configured to control adjustable suspension components individually and in response to detecting certain conditions and statuses of aspects of a vehicle to determine how the different suspension components should be adjusted. Employing embodiments described herein, as a vehicle traverses over uneven terrain, one or more wheels may lose contact with the terrain or may lose traction with the terrain by becoming substantially unloaded whereby the weight of the vehicle is no longer shared by the one or more wheels. This conditions change the status of a wheel, whereby the status of a wheel can include a degree of contact with terrain over which a vehicle is traveling. Optionally, the status of the wheel can include an amount of weight (i.e., vehicle weight) carried by the wheel. This status can be used to determine how the suspension needs to be adjusted to change the status of the wheel to regain contact or become load bearing again.

Various systems and methods may be implemented to determine a status of a wheel of a vehicle 10 using some or all of the components described above with respect to FIG. 1. For example, the speed of rotation of a wheel 12 can be used to determine a wheel status, such as where the wheel has lost at least some degree of contact with terrain or some degree of traction relative to the terrain. The speed of a wheel can be determined in a number of different ways. For example, the speed of rotation of a wheel 12 can be determined using a wheel speed sensor (e.g., wheel status sensor(s) 34), examples of which may be incorporated into braking systems for the wheel and often used with antilock braking systems to avoid wheel lock upon braking. This may involve a toothed wheel where the teeth are counted to determine revolutions per minute.

The status of a wheel 12 may optionally be determined based on a load carried by that wheel or portion of the vehicle weight supported by a wheel. This may be determined, for example, using one or more sensors measuring a force transmitted through the suspension for that wheel. Sensors such as strain sensors, pressure sensors, or the like, such as using suspension sensor 32. Optionally, load can be determined based on tire pressure monitoring to determine a wheel status 12.

Embodiments described herein for automatic suspension adjustment responsive to the status of one or more wheels may be suited for use only in certain circumstances. For example, the embodiments below will primarily be described with respect to off-road vehicle operation or operation of a vehicle over uneven terrain. A vehicle may be equipped to operate in an "off-road mode" whereby suspension adjustments are made to better handle off-road terrain and speeds may be limited for off-road operation.

A user may, such as via a user interface (e.g., UI devices 70 of FIG. 1) select an off-road mode for operating the vehicle off-road. In response, a controller may set adjustable suspension settings to a higher ground clearance. The vehicle may optionally engage differential locks or enable a user to engage/disengage differential locks as the vehicle traverses the off-road terrain. The off-road mode may further limit vehicle speed or disengage from off-road mode in response to vehicle travel above a predetermined speed. Off-road mode may optionally involve employing camera views to be displayed on a user interface of wheels, terrain proximate the wheels, or other views that may help a driver navigate off-road terrain.

As discussed herein, 'off-road mode' refers to a particular operating mode of vehicle 10, e.g., which affects operations of vehicle 10. In this regard, vehicle 10 may be operated in various operating modes (e.g., as controlled by controller 20 and/or other vehicle controllers) that define characteristics of vehicle 10. For example, a 'sport mode' may increase the throttle response, stiffen suspension, modify user interfaces, and/or otherwise affect the characteristics of vehicle 10. Likewise, responsive to a user activating 'off-road mode,' various characteristics and/or operations of vehicle 10 may change. For example, a central display of vehicle 10 may display an 'off-road mode' specific user interface, e.g., which displays relevant data such as vehicle speed, wheel status, tire pressure, etc. In addition, as discussed in greater detail below, operations of the powertrain of vehicle 10 and/or suspension of the vehicle may be adjusted or otherwise controlled in a manner different to a so-called "normal" operating mode of vehicle 10.

FIG. 2 illustrates an example embodiment of a vehicle 100 traveling along terrain 130. When a vehicle having adjustable suspension is operating over rough terrain, it is often desirable to have the suspension set to a high ground clearance where the suspension is has a high ride height or is extended. Off-road mode may automatically change vehicle suspension settings to raise the vehicle to be in a higher ground clearance configuration. In the illustrated embodiment, the vehicle 130 is equipped with an air spring suspension including front air spring 140 for front wheel 110 having air bladder 142 and rear air spring 145 for the rear wheel 120 having air bladder 147.

In the case of air springs used for the adjustable suspension such as for the front air spring 140 and rear air spring 145, the respective air bladders of the air springs may be inflated to a higher pressure such that the suspension is closer to full extension. In the case of coil-over shock absorbers, a ride height adjustment may be adjusted along with suspension damping and preload. This increased ride height enables the vehicle to move over uneven terrain with a lower likelihood that the vehicle underbody will scrape against objects or undulations in the terrain. This additional ride height is illustrated through the clearance of the front wheel 110 indicated by arrow 115 and the clearance of the rear wheel 120 illustrated by arrow 125 between the wheel arches of the body and the top of the respective wheel. However, when the adjustable suspension of the vehicle is extended, there may be less additional suspension extension available which can result in loss of contact between the wheel and the terrain.

As shown in FIG. 2, the terrain includes a rut 135. With suspension extended to a higher ride height, the rear wheel 120 loses contact with the terrain 130 as the rear wheel 120 encounters the rut 135. This may be because the front wheel 110 and wheels (not visible) on the other side of the vehicle 100 retain contact with the terrain 130. Since the suspension is extended. There may not be sufficient additional suspension extension travel available for the rear wheel 120 to follow the terrain 130 into the rut 135.

Embodiments of the present disclosure identify the wheel status of the rear wheel 120 as having lost contact with the terrain 130. This detection can be performed, for example, by a sensor, such as one of sensors 30 of the vehicle 10 of FIG. 1 or motor control unit 16. A sensor can identify a loss of contact by detecting a load supported by the wheel. Such a sensor may include a sensor within the suspension (e.g., suspension sensor 32 of FIG. 1) that determines that the vehicle weight is not being supported by the suspension components for the rear wheel 120. Optionally, the motor control unit 16 can detect a loss of contact between the rear wheel 120 and the terrain 130 by determining that there is very little resistance to rotation of the rear wheel 120 by the motor 14. Wheel speed can optionally be used to determine if contact is lost, such as by determining that a wheel is either no longer turning, or in the case of a driven wheel, the driven wheel can be stopped or intermittently powered off to determine if the wheel is rotating in contact with the terrain.

The degree of contact of a wheel of each driven wheel with the terrain can be determined based on the torque exerted at each wheel, as may be identified based on an electrical draw of an electric motor driving a respective wheel. A very low electrical power draw may indicate that the wheel is slipping on the terrain or the wheel is not in contact with the terrain. An electrical power draw below a threshold amount may indicate that the wheel is not contributing to movement of the vehicle. This threshold amount may be, for example, an amount determined by a controller and possibly set by a manufacturer, based on the electrical power draw to rotate a wheel/tire combination when free-wheeling or when the tire/wheel are suspended in the air. If a wheel is determined to not be effectively contributing to movement of the vehicle, the wheel may cease to be driven. The wheel may be driven again upon detection of movement of the wheel, such as when the wheel status changes to regain contact with the terrain and is rotated indicating the vehicle is advancing forward while the wheel is in contact with the terrain.

In a scenario in which wheel status is determined for a driven wheel based on a force required to rotate the wheel, the amount of force measured at the wheel can determine if the wheel is in contact with terrain. A predetermined resistance or threshold resistance may be established for rotating a wheel that is not in contact with terrain. This threshold may be established using an amount of force required to rotate a wheel that is suspended in the air, and a margin of error may be added to this amount of force to accommodate variables such as mud caked into the tread of a tire which can be substantial for an off-road tire traveling along uneven terrain. If resistance at the wheel or a force required to turn a wheel is below this threshold, the status of the wheel may be determined to be a loss of contact with the terrain.

Based on the determination of the loss of contact of the rear wheel 120 with the terrain 130, the controller (e.g., controller 20) may automatically adjust the suspension of the wheels other than the rear wheel 120. To change the status of the rear wheel 120 to regain contact with the terrain 130, the controller may adjust the suspension of the remaining wheels or all wheels to reduce the suspension height.

FIG. 3 illustrates action taken by the controller to reduce the suspension height of the front wheel 110 in addition to the wheels (not visible) on the opposite side of the vehicle 100. As shown, the front air spring 140 height is reduced by reducing air pressure within air bladder 142. The rear air spring 145 may or may not be adjusted. If the rear air spring 145 remains at the previous height, the suspension of the remaining wheels may be adjusted until the rear wheel 120 status changes to reflect that contact with the terrain 130 has been made. However, according to some embodiments, the suspension for all wheels may be simultaneously adjusted to lower the ride height of the vehicle 100. Lowering the suspension for all wheels can result in the air spring 140 of the front wheel 110 becoming more compressed, along with the air springs for the wheels not visible. However, the air spring 145 for the rear wheel 120 may not be as compressed. This is due to a lack of load on the rear wheel 120 since it is within the rut 135. Once contact is returned between the rear wheel 120 and the terrain 135, the rear air spring 145 will begin to be compressed as the load increases.

FIG. 3 reflects that while the front air spring 140 has been compressed, the rear air spring 145 is less compressed and remains at a height similar to that of the higher ride height. This is evident through the clearance of the front wheel indicated by arrow 115 and the clearance of the rear wheel illustrated by arrow 125. The clearance of the front wheel 110 is reduced substantially between the suspension height of FIG. 2 and that of FIG. 3, while the clearance of the rear wheel 120 is relatively unchanged as the suspension height was not changed between the depictions of FIG. 2 and FIG. 3. However, the wheel status of the rear wheel 120 has changed as it is now in contact with the terrain 130 within the rut 135.

Embodiments described herein can detect a change in status of one or more wheels, such that adjustment to the suspension of the vehicle can occur until a status change is achieved. In the example of FIGS. 2 and 3, the suspension for the front wheel 110 and remaining wheels not visible in the figures can be lowered until the status of the rear wheel 120 changes to reflect contact with the terrain is returned. In a scenario in which the suspension lacks sufficient range of adjustment to change a status of a wheel, the suspension adjustment may reach the limit of adjustability and remain at that limit as the vehicle travels until such time as the wheel status changes to reflect contact with the terrain has returned.

For off-road vehicles, a common measure of the ability of a vehicle to flex its suspension is using the Ramp Travel Index (RTI). In this scenario, one wheel of a vehicle is driven up a ramp having an angle of between about 15 degrees and 30 degrees relative to the horizontal until at least one other wheel loses some degree of contact with the ground. The RTI uses a distance traveled along the ramp and a wheelbase length of a vehicle to calculate the RTI. A higher RTI reflects a higher degree of flexibility in the suspension. In the scenario given above, with the adjustable suspension in a high ground clearance position, the suspension has a relatively lower RTI as there is less suspension travel or jounce available.

FIG. 4 illustrates an example embodiment of a vehicle 200 traveling up a ramp 250 mimicking the test to measure RTI. In the illustrated embodiment, the front air spring 240 and rear air spring 245 are adjusted for a high ride height. As shown, the front wheel 220 has traveled a first distance shown by arrow 205 along the ramp 250. With the suspension having a low degree of articulation available, the rear wheel 220 has begun to lose contact with the surface at 222. In this scenario, the right wheels of the vehicle, not visible in FIG. 4, are likely to remain in contact with the surface and rear wheel 220 is the first to lose contact. The wheel that loses contact first is vehicle-dependent and differs based on a variety of wheel and suspension factors.

To improve the flexibility of the suspension and improve the ability of the vehicle to maintain contact with the surface, embodiments described herein can adjust the suspension of the vehicle to lower the ride height of the suspension in order to increase the maximum available jounce travel. FIG. 5 illustrates the lowering of the ride height of the front wheel 210 with the front air spring 240 improving the amount of available jounce or travel and lowers the ride height of the rear wheel 220. The suspension on the right side of the vehicle are similarly lowered. While it may be counterintuitive for a driver to lower ride height in order to regain traction when one wheel loses contact with a surface, embodiments described herein automatically lower the ride height by reducing pressure in the air springs at each corner of the vehicle in response to one wheel (the front wheel 210) compressing the suspension significantly, while another wheel (the rear wheel 220) loses contact with the surface. In reducing the ride height of the suspension at all four corners, the vehicle is able to travel further along the ramp as shown by the arrow 207. This increases the RTI of the vehicle and improves both performance and safety.

The example embodiment of FIGS. 2 and 3 adjust suspension describe a scenario in which the suspension of one wheel may be adjusted differently than the others, the embodiment of FIGS. 4 and 5 describe a scenario in which the suspension of all wheels is adjusted at the same time. The difference between the scenarios of FIGS. 2 and 3 and that of FIGS. 4 and 5 is the suspension travel at each of the wheels at a time when a wheel is determined to lose contact with the surface. In the scenario of FIG. 2, three wheels are experiencing normal suspension travel as would be expected when traveling on level ground when one wheel (the rear wheel 120) loses contact with the terrain 130. Conversely, according to the scenario of FIG. 4, when the rear wheel 220 loses contact with the surface, the front wheel 210 is experiencing substantial suspension compression.

The suspension ride height and suspension compression or load experienced at each wheel can be determined as described above using a sensor such as suspension sensor 32. In doing so, the suspension status of each wheel can be used at the point when a wheel status of one of the wheels changes to reflect a loss of contact with the terrain to identify how suspension adjustments can be made to change the status of the wheel that lost contact with the terrain.

The embodiment of FIGS. 2 and 3 include suspension inputs from three wheels as normal travel, while one wheel status changes to losing contact. In response, the air springs of the suspension of the wheels that remain in contact are lowered to a lower ride height to change the status of the wheel that lost contact to regain contact with the terrain.

The embodiment of FIG. 4 includes suspension inputs of varying degrees of suspension travel including highly compressed at the front wheel 210 and an extended rear wheel 220. As the extended rear wheel 220 has little load, which can be established based on a suspension sensor 32 or motor control unit 16, among other ways described above, it can be determined that the rear wheel 220 is losing contact with the surface.

Since the suspension is already at a high ride height, the suspension at each corner is lowered, enabling greater travel or jounce at the front wheel 210, while changing the status of the rear wheel 220 to re-contact the surface.

Embodiments described herein improve the degree of contact between wheels and the terrain when the terrain is uneven, thereby improving traction and safety. The adjustments made to the suspension described above may cause the vehicle to not be level (e.g., front-to-back, side-to-side, or both) as the focus is to maintain contact between the wheels and the terrain. However, adjustments made to the suspension may be limited to a predetermined degree of travel. In some scenarios, a wheel may lose contact with terrain and be suspended above a significant drop-off, such that suspension adjustment alone will not cause the wheel to regain traction. In such scenarios, having a limit to the suspension adjustment ensures that suspension changes do not over-adjust, particularly when features of the terrain preclude contact between a wheel and the terrain.

According to some embodiments, a user interface, such as a UI device 70 embodied as a display screen or one or more of visual and/or audio cues may alert a driver as to the status of each wheel and may alert a driver as to any automatic suspension changes made to accommodate wheel status changes. Further, in the event suspension adjustment range is insufficient to change a wheel status to regain contact with terrain, a driver may be alerted to such an issue. Optionally, vehicle speed may be limited while a wheel status reflects a lack of contact with terrain. This limitation of vehicle speed can be beneficial as if the vehicle continues to advance, the next point of contact for the wheel whose status is out of contact with terrain may be abrupt and such an abrupt wheel status change could damage the wheel if the vehicle speed is too high. A driver may optionally be alerted to any such speed limitations to convey to the driver that vehicle functionality is limited while a wheel status is out of contact with the terrain.

A status of a wheel may optionally include a degree of contact between the wheel and terrain. In some cases, the scenario of FIG. 2 above may have sufficient suspension travel available in the rear wheel 120 to maintain contact with the terrain. However, the contact may be limited.

Off-road travel for vehicles can involve lower tire pressure set points than when a vehicle is traveling on a paved road surface. This "airing down" of a tire to a lower tire pressure results in a larger contact patch between the tire and the terrain. This is beneficial for soft and/or loose surfaces such as sand and mud but may also be beneficial to travel over very uneven terrain, such as rock crawling. Airing down results in substantially more tire "squish" to achieve the larger contact patch. This means that a tire can be in contact with a surface, and even if you were to lift the weight of the vehicle off of that wheel, the wheel may still contact the terrain as the tire may maintain contact during several inches of squish. Given this scenario, the amount of load carried by a wheel of a vehicle may not accurately be reflected by whether there is contact between the wheel and the terrain. Thus, a degree of contact may be used to as a wheel status of a vehicle.

Using the degree of contact as a status of a wheel, a degree of contact below a predetermined threshold may be used to determine if automatic suspension adjustment is appropriate. This degree of contact may be established, for example, by an amount of load carried by a wheel of the vehicle. Optionally, the degree of contact may be determined using an amount of force required to rotate the wheel, in a similar manner as described above. However, as physical contact may remain even when there is a low degree of contact between the wheel and the terrain, the threshold for determining when to make automatic suspension adjustments may be higher that that of determining that a wheel is no longer in contact with the terrain.

A degree of contact or loss of contact of a wheel with the terrain may optionally be determined based on wheel rotational speed. For example, if one wheel of the vehicle is spinning at a higher rate than the remaining wheels, that wheel may be slipping due to loss of traction or entirely out of contact with terrain. Such determination would require the wheel that has a lower degree of contact or no contact with terrain to be a driven wheel.

The example embodiment of FIGS. 2 and 3 reflects a scenario in which a vehicle is traveling over uneven terrain with the adjustable suspension resulting in a loss of contact with the terrain. However, embodiments described herein can optionally be employed in scenarios in which contact with terrain is maintained, but where traction is reduced or lost. In such a scenario, suspension adjustment can increase a share of the vehicle weight born on the wheel having reduced or lost traction. Such adjustment can be applied in a manner similar to that described with respect to the wheel status being a loss of contact, but instead where the wheel status being a loss of traction.

The example embodiment of FIGS. 2 and 3 also reflect a scenario in which the vehicle suspension is set to a high ride height with insufficient remaining articulation to adjust to the rut 135 in the terrain 130. However, embodiments can optionally include a scenario in which the suspension is set to a lower ride height, but the suspension is stiffened such that available articulation is kept relatively low. Such a suspension setting may be used generally for improved road surfaces, such as paved roads or smoother unpaved roads.

In such a scenario the vehicle may not be operating in an "off-road" mode with the suspension ride height raised. In such a scenario, a similar issue may arise as is illustrated in FIG. 2, whereby a significant undulation in the road surface (e.g., a large pothole) results in a wheel losing contact with the road surface. In such a scenario, the wheel status would again lose contact with the terrain. However, since the suspension ride height is not set to a high level, the suspension has available travel available. In a case in which suspension is not at a maximum ride height and a wheel status occurs where contact with the terrain is lost, the wheel having lost contact may have the suspension adjusted to extend the suspension for that wheel. The suspension could be extended until one or more sensors determine that the wheel status has changed to regain contact with the terrain.

FIG. 6 illustrates a flowchart of a method for suspension control, and more particularly, for controlling air suspension of a vehicle responsive to suspension travel positions. As shown, a status of at least one wheel of a vehicle is determined at 310. This status may be, for example, that the wheel has lost contact with terrain over which the vehicle is traveling which may be determined based on sensor feedback (e.g., from sensor(s) 30) to the controller 20. A suspension height of at least one remaining wheel of the vehicle other than the at least one wheel is identified at 320. This may be detected by sensor(s) 30 or optionally identified by the commanded ride height for the remaining suspension. The suspension height of the at least one remaining wheel may be adjusted using a suspension system having a plurality of height-adjustable springs, each of the plurality of height-adjustable springs associated with a respective wheel of the vehicle to change the status of the at least one wheel as shown at 330. The status of the at least one wheel may be determined based on sensor(s) 30 of controller 20, for example.

As described above, FIG. 6 illustrates a flowchart of methods, computer program products, and systems according to an example embodiment of the disclosure. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory 60 of a controller 20 employing an embodiment of the present disclosure and executed by the processor 50 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks.

These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the method of FIG. 9 above may comprise a processor (e.g., the processor 50) configured to perform some or each of the operations (310-340) described above. The processor may, for example, be configured to perform the operations (310-340) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-340 may comprise, for example, the processor 50 and/or a device or circuit for executing instructions or executing an algorithm for processing information as described above.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the embodiments set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A vehicle comprising:

a suspension system comprising a plurality of height-adjustable springs, each of the plurality of height-adjustable springs associated with a respective wheel of the vehicle;

at least one sensor; and a controller configured to:

responsive to detecting, with the at least one sensor, a status of at least one wheel indicative of a lack of contact between the at least one wheel and a terrain over which the vehicle is traveling and a suspension height of the at least one wheel not having additional suspension extension travel available to regain contact with the terrain;

identify a suspension height of at least one remaining wheel other than the at least one wheel; and adjust the suspension height of the at least one remaining wheel to change the status of the at least one wheel.

2. The vehicle of claim 1, wherein the status comprises a degree of contact with a terrain over which the vehicle is traveling.

3. The vehicle of claim 1, wherein the controller configured to adjust the suspension height of the at least one remaining wheel to change the status of the at least one wheel comprises the controller configured to:

adjust the suspension height of the at least one remaining wheel to regain contact between the terrain and the at least one wheel.

4. The vehicle of claim 3, wherein the controller configured to adjust the suspension height of the at least one remaining wheel to regain contact between the terrain and the at least one wheel comprises the controller configured to:

adjust the suspension height of the at least one remaining wheel independently to regain contact between the terrain and the at least one wheel.

5. The vehicle of claim 3, wherein the controller configured to adjust the suspension height of the at least one remaining wheel to regain contact between the terrain and the at least one wheel comprises the controller configured to:

lower the suspension height of the at least one remaining wheel to regain contact between the terrain and the at least one wheel.

6. The vehicle of claim 1, wherein the status comprises a reduced level of contact with a terrain over which the vehicle is traveling.

7. The vehicle of claim 6, wherein the reduced level of contact with the terrain over which the vehicle is traveling is determined based, at least in part, on a measured rotational torque at the at least one wheel.

8. The vehicle of claim 7, wherein the reduced level of contact with the terrain is determined based, at least in part, on the measured rotational torque at the at least one wheel being a predefined amount below an expected rotational torque at the at least one wheel.

9. A method comprising:

determining, with at least one sensor, a status of at least one wheel of a vehicle, wherein the status comprises a lack of contact between the at least one wheel and terrain over which the vehicle is traveling;

determining a suspension height of the at least one wheel not having additional suspension extension travel available to regain contact with the terrain;

identify a suspension height of at least one remaining wheel of the vehicle other than the at least one wheel; and adjusting the suspension height of the at least one remaining wheel using a suspension system comprising a plurality of height-adjustable springs, each of the plurality of height-adjustable springs associated with a respective wheel of the vehicle to change the status of the at least one wheel.

10. The method of claim 9, wherein the status comprises a degree of contact with a terrain over which the vehicle is traveling.

11. The method of claim 9, wherein adjusting the suspension height of the at least one remaining wheel to change the status of the at least one wheel comprises:

adjusting the suspension height of the at least one remaining wheel to regain contact between the terrain and the at least one wheel.

12. The method of claim 11, wherein adjusting the suspension height of the at least one remaining wheel to regain contact between the terrain and the at least one wheel comprises:

adjusting the suspension height of the at least one remaining wheel independently to regain contact between the terrain and the at least one wheel.

13. The method of claim 11, wherein adjusting the suspension height of the at least one remaining wheel to regain contact between the terrain and the at least one wheel comprises:

lowering the suspension height of the at least one remaining wheel to regain contact between the terrain and the at least one wheel.

14. The method of claim 9, wherein the status comprises a reduced level of contact with a terrain over which the vehicle is traveling.

15. The method of claim 14, further comprising:

measuring rotational torque at the at least one wheel; and determining the reduced level of contact with the terrain over which the vehicle is traveling.

16. The method of claim 15, further comprising:

determining the reduced level of contact with the terrain based, at least in part, on the measured rotational torque at the at least one wheel being a predefined amount below an expected rotational torque at the at least one wheel.

17. An apparatus including at least one processor and at least one non-transitory memory including computer program code instructions, the computer program code instructions configured to, when executed by the at least one processor, cause the apparatus to:

determine, with at least one sensor, a lack of contact between at least one wheel and a terrain over which a vehicle is traveling;

determine a suspension height of the at least one wheel not having additional suspension extension travel available to regain contact with the terrain;

identify a suspension height of at least one remaining wheel of the vehicle other than the at least one wheel; and adjust the suspension height of the at least one remaining wheel using a suspension system comprising a plurality of height-adjustable springs, each of the plurality of height-adjustable springs associated with a respective wheel of the vehicle to regain contact of the at least one wheel with the terrain.

18. The apparatus of claim 17, wherein causing the apparatus to adjust the suspension height of the at least one remaining wheel to regain contact between the terrain and the at least one wheel comprises causing the apparatus to:

adjust the suspension height of the at least one remaining wheel independently to regain contact between the terrain and the at least one wheel.

* * * * *